Nov. 12, 1963
H. HURVITZ
3,110,861
VARIABLE SCAN RATE SPECTRUM ANALYZER
Filed Nov. 9, 1956
2 Sheets-Sheet 1
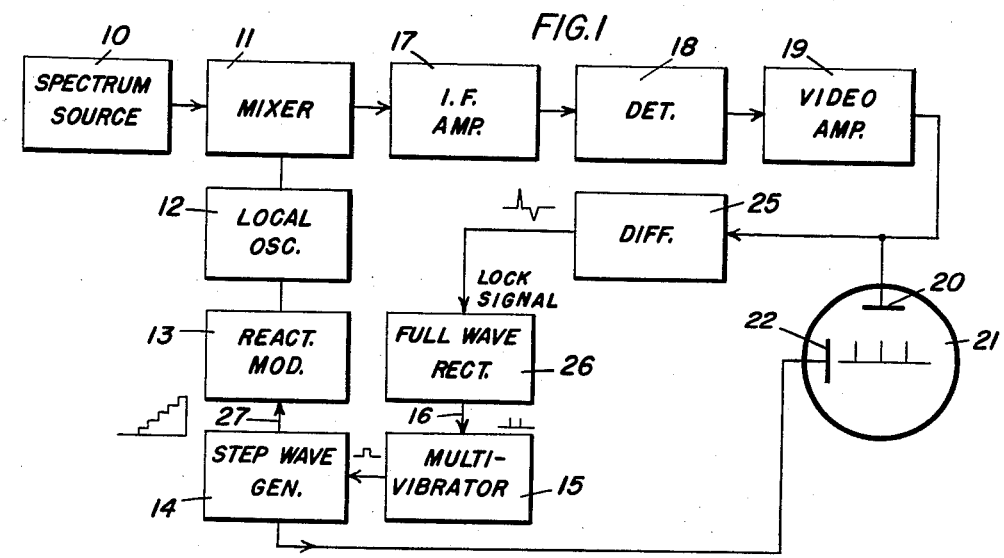
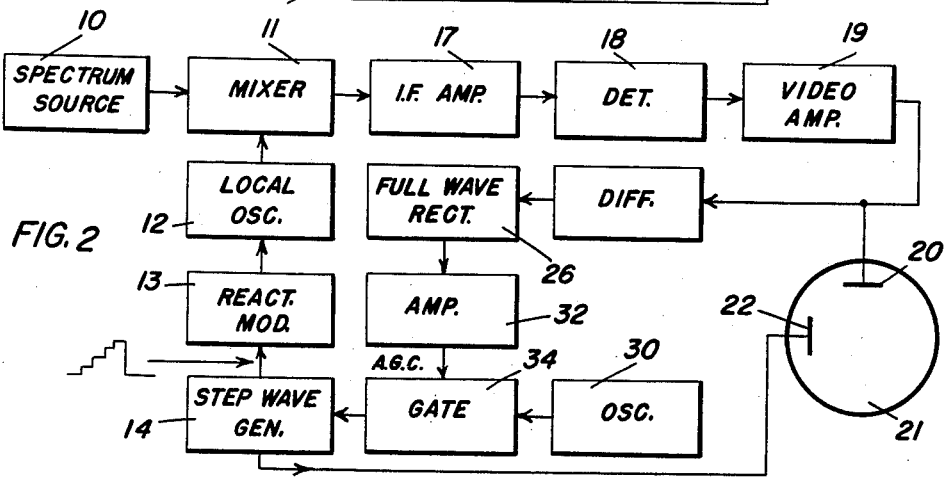
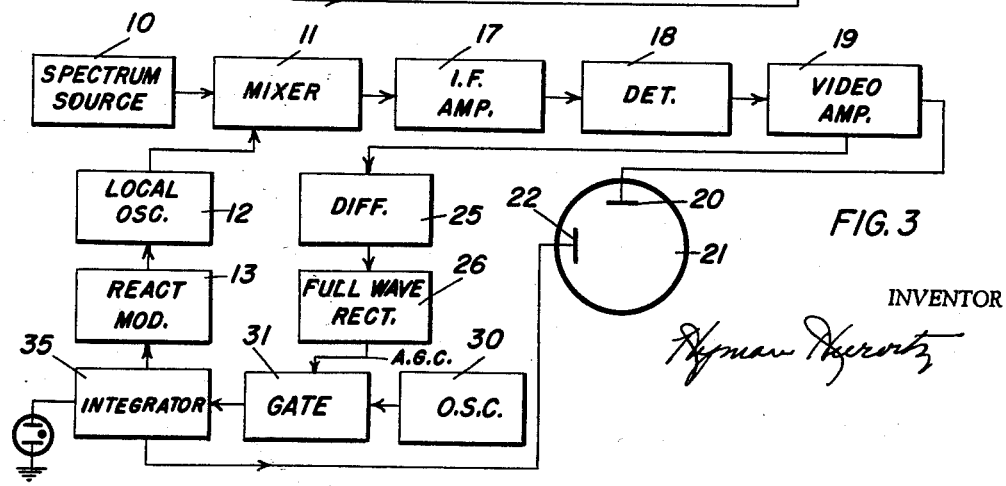
INVENTOR
Hyman Hurvitz Nov. 12, 1963
H. HURVITZ
3,110,861
VARIABLE SCAN RATE SPECTRUM ANALYZER
Filed Nov. 9, 1956
2 Sheets-Sheet 2
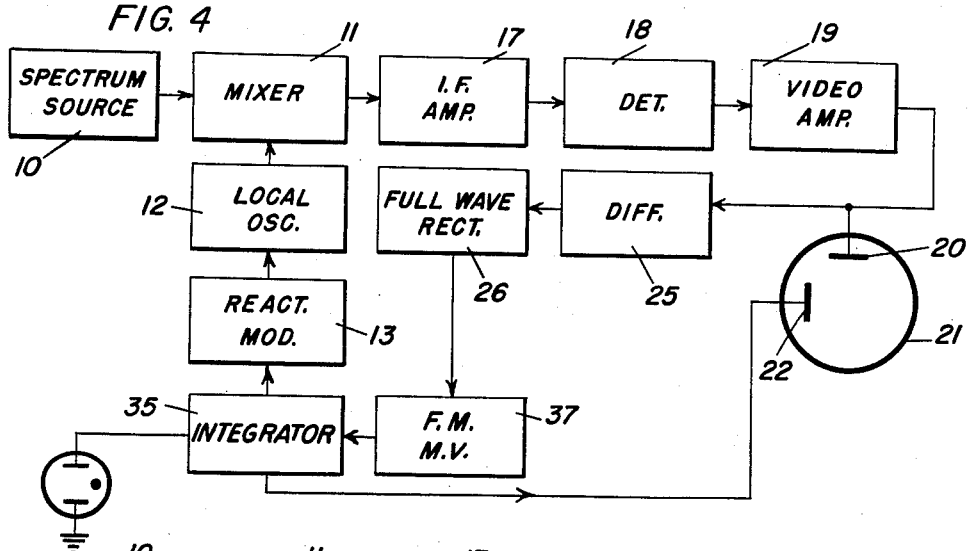
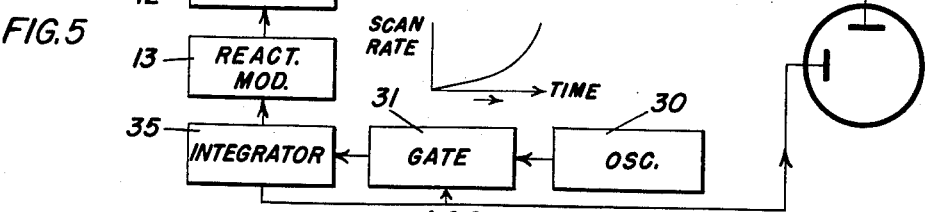
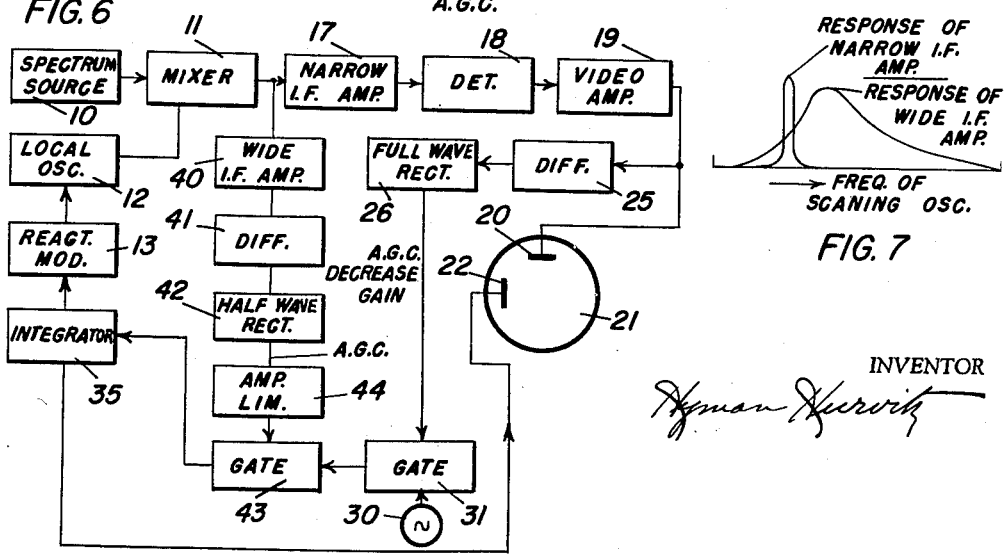
INVENTOR
Hyman Hurvitz

United States Patent Office 3,110,861
Patented Nov. 12, 1963

3,110,861
VARIABLE SCAN RATE SPECTRUM ANALYZER
Hyman Hurvitz, 1313 Juniper St. NW., Washington, D.C.
Filed Nov. 9, 1956, Ser. No. 621,382
11 Claims. (Cl. 324—77)

The present invention relates generally to spectrum analyzers of the frequency scanning type, and more particularly to scanning spectrum analyzers having devices for effecting rapid scan in the absence of an indicated signal and zero or reduced scan speed in the presence of an indicated signal.

It is a recognized problem in the field of spectrum analyzers of the frequency scanning type to increase the scan rate for a given resolution, or to decrease the resolution for a given scan rate or both. The problem arises from the property of band pass filters that time is required to permit an impressed signal to build up or decay, and that this time is a function of band-width of the filter. So, in a frequency scanning spectrum analyzer of the superheterodyne type, scan time must be sufficiently slow to permit the I.F. amplifier to respond to a signal and for the response to disappear or be sharply reduced before an adjacent signal is scanned into the I.F. amplifier, if the signals are to be resolved. The relation between I.F. band-width and scanning rate is usually given as:

(1) $$B.W. = 1.50 \sqrt{\frac{df}{dt}}$$

where B.W. is I.F. band-width in c.p.s., and $$\frac{df}{dt}$$

is scanning rate in c.p.s. per second. This is an approximate relation, but adequate to the situation.

According to the present invention frequency scanning, in a superheterodyne type spectrum analyzer, is accomplished in response to a step wave generator or an integrator, rather than a true saw-tooth generator. The step-wave generator or integrator is stepped by signal from an oscillator, for example a multivibrator, and the rate of scan is set far above that for optimum resolution. As soon as a signal is sensed in the I.F. channel, the oscillator or multi-vibrator is locked, so that scanning ceases, and the lock continues until the signal has attained a steady state, following either an increase or a decrease. When the signal has attained a steady state, the multi-vibrator is unlocked. It then generates one cycle, and if the I.F. channel is free of signal continues to oscillate, but if a time varying signal is present the multi-vibrator is again locked until the signal attains a steady state.

The present system, accordingly, achieves the result that the scan rate is not limited by the resolution of the system, or the resolution by the scan rate. Extremely low resolutions may be employed, with extremely high scan rates. This is particularly important for audio or sub-audio spectrum analyzers, where the band examined is extremely wide in relation to the resolutions obtained.

It is, accordingly, a primary object of the present invention to provide a novel spectrum analyzer in which no restriction on attainable resolution is involved in selecting a scan rate, or repetition frequency.

It is a further object of the invention to provide a system of scanning spectrum analysis in which scan rate is zero or nearly zero while a visual signal is being generated, and is high otherwise.

The above and still further objects, features and advantages of the present invention will become apparent upon consideration of the following detailed description of one specific embodiment thereof, especially when taken in conjunction with the accompanying drawings, wherein:

FIGURE 1 is a block diagram of a system according to the present invention;
FIGURES 2–6 are block diagrams of modifications of the system of FIGURE 1; and
FIGURE 7 is a plot of I.F. band-pass characteristics for the system of FIGURE 6.

In FIGURE 1, the reference numeral 10 denotes a source of a frequency spectrum, without intending any limitation on the nature of the source or the spectrum. The spectrum is applied to a mixer 11, to which is also applied signal from a local oscillator 12. The latter is frequency modulated by a reactance tube 13, which is in turn controlled by a step-wave generator 14. The latter is stepped in response to square waves supplied by a multivibrator 15, although sinusoidal waves supplied by a resonant oscillator may also be applied. The step wave generator 15 provides a predetermined number of steps, building up to a predetermined voltage following which the voltage automatically decreases to zero and the build up recommences. The multivibrator 15 is normally free running, but may be locked and cease oscillating, in response to a signal applied over lead 16.

The output of the mixer 11 is applied to an I.F. amplifier 17 having a desired resolution or band-width, and the output of the latter is detected in detector 18, amplified to a suitable level in a video amplifier 19 and applied to the vertical deflection electrode 20 of a cathode ray tube indicator 21. The output of sawtooth generator 14 is applied to the horizontal electrode 22, to effect horizontal scan of the beam of the indicator 21.

From the output of video amplifier 19 is applied a differentiating circuit 25, which, via a full wave rectifier 26, supplies locking signal to the multivibrator or oscillator 15.

In operation the local oscillator and mixer 11 progressively scan the spectrum provided by source 10 past the I.F. amplifier, as the step wave 27 increases in amplitude. So long as no signal appears in the output of video amplifier 20 the multivibrator 15 oscillates at its assigned rate, and the system operates, broadly speaking, in conventional fashion except for the utilization of a step-wave for scanning. The latter, however, approximates a saw-tooth wave.

As soon as a signal appears in the output of video amplifier 19 locking signal is applied to the M.V. 15, and scanning stops. This signal is generated by differentiation of the output of video amplifier 19. As soon as the signal at the video amplifier 19 attains full amplitude, i.e., is no longer a transient, the locking signal disappears and scanning begins again. If, when the oscillator has generated one oscillation, the signal in the video amplifier 19 changes value, and the change may be either upward or downward by virtue of the action of the full wave rectifier 26, the M.V. 15 is again locked until steady state is attained.

The multivibrator 15, accordingly, oscillates slowly, due to intermittent locking thereof, while the system is scanning through a signal, but not otherwise.

The results attainable in scanning a 10,000 c.p.s. band with 10 c.p.s. resolution, assuming a total of 10 frequencies in the spectrum, is immediately obvious. At least 1,000 steps, and preferably about 3,000 or 4,000 steps, are required of the step generator, per scan. Allow one second to complete each frequency scan, in the absence of signals. Each signal encountered will require about $\frac{2}{10}$ second to build up and decay, which consumes $\frac{2}{10}$ second per signal, and the total scan time is thus about three seconds, for a scan which encounters 10 signals. The scanning rate for a band of 10,000 c.p.s. for 10 c.p.s. resolution, involves a scan time of several minutes, in a conventional system. In essence, the conventional system is designed on the assumption that signals exist, for the assumed facts, at 10 c.p.s. intervals, or allows for this condition as possible. The assumption then is that 1,000 discrete signals exist in the spectrum under examination. If in fact only 10 exist, an improvement of 100 to 1 is possible by means of the present invention. If in fact 1,000 signals do exist, improvement still occurs in that response to a single frequency signal is not spread over the face of the indicator, as is true in conventional systems, but has only a single abscissa, i.e., appears visually as a single vertical line. Visual resolution between adjacent frequencies is thus facilitated.

The system of FIGURE 2 follows that of FIGURE 1 except in that an oscillator 30 and a gate 31 are substituted for the multivibrator 15 and the lock circuit of FIGURE 1. The product of full wave rectifier 26 is here used as an AGC signal to block gate 31, or to reduce its gain and thus partially block it.

It will be noted that, in FIGURES 1 and 2, the scan rate should preferably be such that at least two (and preferably about four) cycles of the oscillator 30 are required to scan a signal through the pass band of the I.F. amplifier. The amplifier 32 is optional.

In the system of FIGURE 3 an integrator 35 is substituted for the step generator of FIGURES 1 and 2. The advantage is that the integrator is a simpler circuit than a step wave generator, where a large number of steps is involved.

In the system of FIGURE 4 the output of full wave rectifier 26 is applied to reduce the frequency of an oscillator 37, rather than to reduce the amplitude of its output. While the device 37 is specifically illustrated as a multivibrator, an oscillator and reactance tube may be employed instead, the latter responsive to the control signal. Multivibrators which have output frequency responsive to control voltage are also well known.

In FIGURES 5 and 6 are illustrated systems which present an improvement of the systems of FIGURES 1–4, inclusive, in that smaller resolution may be attained with a higher scan rate. As extremely low resolutions are approached, by narrowing the I.F. bandwidth, in a system according to FIGURE 1, for example, the danger arises that, especially for low amplitude signals, control voltage will not have time to build up to adequate amplitude in the time allowed for the signal to scan through the I.F. amplifier. In the systems of FIGURES 5 and 6, a relatively wide band I.F. amplifier is employed to slow the scan rate as a signal approaches the narrow band I.F., since the wide band I.F. amplifier may have a rapid response. Thus, there is assurance that as a signal approaches the narrow I.F. amplifier, the scan rate is slowed sufficiently to assure that the I.F. amplifier will have time to provide an adequate response to the signal.

The system of FIGURE 6 generally duplicates the system of FIGURE 3, and the same numerals of reference identify corresponding elements in the two systems. FIGURE 6 additionally includes a wide I.F. amplifier 40, connected to the output of mixer 11, and a differentiator 41 and half wave rectifier or detector 42 to develop AGC voltage for a supplementary gate 42 in cascade with gate 31 between oscillator 30 and integrator 35. The wide I.F. amplifier 40 may be considerably narrower than optimum, as defined by Equation 1, and the amplifier 17 may be tuned to about the half power point of that part of the response curve of I.F. amplifier 40 which involves increased response as a signal is scanned through the amplifier. This provides a point of maximum I.F. amplifier slope and hence maximum differentiated AGC signal. The half wave rectifier 42 is so poled as to pass signal to gate 43 only while response in wide I.F. amplifier 40 is increasing. Hence, decay of signal in wide I.F. amplifier 40 will not provide control signal. This condition is indicated in FIGURE 7.

The gate 31 may be adjusted to cut off completely in response to control signal derived from full wave rectifier, in response to the smallest signal it is desired to indicate. However, it is within the scope of the invention to reduce gate 31 to low gain condition, instead of to cut-off condition. The gate 43, on the other hand, need not be cut off since its function is to reduce scan rate. If it is cut off the only effect may be that scan rate will be reduced unduly. It is, therefore, desirable to include an amplitude limiter 44 in cascade between half-wave rectifier 42 and gate 43, which will limit the reduction in gain of gate 43 to a predetermined value, and prevent complete cut-off in the presence of large signals. The wide I.F. amplifier 40 may then be made high gain so as to provide the necessary AGC voltage in response to small signals.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A superheterodyne scanning spectrum analyzer having a frequency conversion system for said spectrum, said frequency conversion system including a local oscillator, voltage responsive frequency modulating means for said local oscillator, a source of said voltage, an intermediate frequency amplifier for selecting conversion products of said conversion system, a visual indicator having means for producing a visual indication movable in two coordinate directions, means for effecting movement of said indication in a first of said directions in response to said voltage, means for effecting movement of said indication in the other of said directions in response to signal output from said intermediate frequency amplifier, wherein said voltage is a step voltage, and said source of said voltage is an integrator of periodic signals, and means responsive to presence of signal in said intermediate frequency amplifier for reducing the amplitudes of the steps of said step voltage.

2. The combination according to claim 1, wherein is provided a source of free running oscillations for generating said periodic signals and wherein said integrator includes means responsive to signal output from said source for increasing said voltage step-wise in response to cylces of output of said source.

3. The combination according to claim 2, wherein is provided means for reducing the rate of transfer of energy from said periodic signals to said integrator from said source during and in response to existence of transient signal in said I.F. amplifier.

4. In a spectrum analyzer for a spectrum of frequencies, a frequency gate, voltage responsive means for scanning said spectrum of frequencies past said gate, means for generating said voltage comprising a step wave voltage generator which varies its output voltage stepwise in response to signal pulsations, and means for at least partially blocking application of said signal pulsations to said step wave voltage generator in response only to transient signal in said gate.

5. In a scanning spectrum analyzer, a narrow band frequency gate, a source of a wide band of frequencies, means for relatively scanning said wide band of frequencies and said narrow band frequency gate in response to a scan signal such that individual frequencies of said wide band of frequencies pass though said narrow band frequency gate in succession, said means for relatively scanning including a source of oscillations, a signal integrator of said oscillations for developing said scan signal, control voltage responsive means for reducing the rate of supply of oscillation energy to said signal integrator for integration thereby and means responsive to the rate of change of signal amplitude in said frequency gate for developing said control voltage.

6. The combination according to claim 5, wherein said rate of supply of oscillation energy is reduced to zero.

7. The combination according to claim 5, wherein is further provided means for reducing said rate of supply of oscillation energy to said signal integrator in response to approach of scanned signal to said narrow band frequency gate sufficiently to permit predetermined response of said gate to a signal scanned therethrough.

8. In a scanning spectrum analyzer, a frequency spectrum source, a mixer having an input circuit coupled to said frequency spectrum source, a local oscillator, means coupling said local oscillator and said mixer, whereby heterodyning takes place between said spectrum and the output of said local oscillator, voltage responsive means for varying the tuning of said oscillator over a range of frequencies as wide as said frequency spectrum, said last means coupled to said oscillator, means coupled to said voltage responsive means for generating said voltage, said last means including a voltage integrating device having an input circuit, and a source of repetitive signals coupled to said input circuit of said voltage integrating device for effecting a small increase of the integrated voltage in response to each of said repetitive signals, said mixer having an output circuit, an I.F. amplifier coupled to said output circuit, a detector coupled in cascade to said I.F. amplifier, a video amplifier coupled in cascade to said detector, a visual indicator having means for producing a visual indication movable in two coordinate directions, means for effecting movement of said indication in a first of said directions in response to said voltage, means for effecting movement of said indication in the other of said directions in response to signal output from said video amplifier, and means responsive to rate of change of signal on said video amplifier for controlling the rate of change of said integrated voltage inversely to said first mentioned rate of change.

9. The combination according to claim 8, wherein is provided means for generating a control signal in response only to variation of said signal output of said video amplifier, and means responsive to said control signal for controlling transfer of said repetitive signals to said voltage integrating device.

10. The combination according to claim 5 wherein said source of oscillations is a frequency variable source of oscillations variable in frequency in response to said control voltage.

11. The combination according to claim 5 wherein said source of oscillations is a constant frequency source and wherein is provided means for varying the amplitude of said oscillations as applied to said signal integrator in response to said control voltage.

References Cited in the file of this patent

UNITED STATES PATENTS

| | | |
|---|---|---|
| 2,414,096 | Dimond | Jan. 14, 1947 |
| 2,507,525 | Hurvitz | May 16, 1950 |
| 2,525,679 | Hurvitz | Oct. 10, 1950 |
| 2,619,590 | Williams | Nov. 25, 1952 |
| 2,632,036 | Hurvitz | Mar. 17, 1953 |
| 2,646,545 | King | July 21, 1953 |
| 2,705,742 | Miller | Apr. 5, 1955 |